(12) United States Patent
Chuang

(10) Patent No.: US 7,243,518 B1
(45) Date of Patent: Jul. 17, 2007

(54) HYDRAULIC CUT-OFF PRESS

(76) Inventor: Sen-Jung Chuang, No. 90-10, Hsia Kwei Jou San, Tan Shui Chen, Taipei County (TW)

( * ) Notice: Subject to any disclaimer, the term of this patent is extended or adjusted under 35 U.S.C. 154(b) by 213 days.

(21) Appl. No.: 11/038,209

(22) Filed: Jan. 21, 2005

(51) Int. Cl.
- *B21J 13/00* (2006.01)
- *B30B 1/18* (2006.01)
- *E02D 27/44* (2006.01)
- *F16M 9/00* (2006.01)

(52) U.S. Cl. .............. 72/129; 72/181; 72/448; 83/559; 100/290; 248/656

(58) Field of Classification Search .............. 72/129, 72/448, 181; 83/527, 829, 559–560; 100/287–290, 100/269.12, 269.27; 248/650, 656, 678, 248/637
See application file for complete search history.

(56) References Cited

U.S. PATENT DOCUMENTS

| 368,672 | A | * | 8/1887 | James | 83/462 |
|---|---|---|---|---|---|
| 434,011 | A | * | 8/1890 | Wrigley | 248/656 |
| 2,321,486 | A | * | 6/1943 | Holt | 248/669 |
| 3,111,054 | A | * | 11/1963 | Tishken | 83/320 |
| 3,239,169 | A | * | 3/1966 | Sloyan | 248/656 |
| 6,182,492 | B1 | * | 2/2001 | Raffin et al. | 72/454 |
| 6,378,348 | B1 | * | 4/2002 | Katsube | 72/312 |
| 6,474,125 | B1 | * | 11/2002 | Denis et al. | 72/306 |

* cited by examiner

Primary Examiner—Daniel C. Crane
(74) Attorney, Agent, or Firm—Troxell Law Offices, PLLC

(57) ABSTRACT

A hydraulic cut-off press includes a base, a body vertically movable along vertical tracks at the base, a plurality of raisers provided at the body in four corners, each raiser having a holder base, a raiser screw vertically mounted in the holder base and fixedly connected to the base, a transmission gear set mounted inside the holder base and meshed with the raiser screw, and an axle extended out of the holder base, a transmission system formed of transmission shafts and couplings for coupling the axles of the raisers to one another for synchronous rotation, and a motor for rotating the axle of the first raiser to move the raiser screws of the raisers to move the body to the desired elevation relative to the base.

2 Claims, 6 Drawing Sheets

HYDRAULIC CUT-OFF PRESS

BACKGROUND AND SUMMARY OF THE INVENTION

The present invention relates to a hydraulic cut-off press for cutting metal sheet members and more specifically, to such a hydraulic cut-off press that can conveniently smoothly be operated to adjust the body to the desired elevation relative to the base.

A hydraulic cut-off press may be used in a metal processing machine for cutting the processed metal product such as U-shaped steel product, Z-shaped steel product, corrugated metal sheet product, or enameled metal tile product. As shown in FIG. 1, the processed metal product delivered from the metal processing machine 9 to the body 921 of a hydraulic cut-off press 92 for cutting by the cutting dies 9211 in the body 921 subject to the desired length. The lead-out height and angle of the processed metal product must fit the position of the body 921 of the hydraulic cut-off press 92 so that the processed metal product can be cut accurately. If the lead-out height of the processed metal product does not fit the position of the body 921 of the hydraulic cut-off press 92, the operator may be unable to perform the cutting operation smoothly.

The present invention has been accomplished under the circumstances in view. It is therefore the main object of the present invention to provide a hydraulic cut-off press, which can smoothly be operated to move the body of the hydraulic cut-off press to the desired elevation relative to the base to fit different cutting metal-working operations. It is another object of the present invention to provide a hydraulic cut-off press, which can be used with a controller-controlled motor to lift the body of the hydraulic cut-off press to the desired elevation relative to the base automatically. To achieve these and other objects of the present invention, the hydraulic cut-off press comprises a base, a body vertically movable along vertical tracks at the base, a plurality of raisers provided at the body in four corners, each raiser having a holder base, a raiser screw vertically mounted in the holder base and fixedly connected to the base, a transmission gear set mounted inside the holder base and meshed with the raiser screw, and an axle extended out of the holder base, a transmission system formed of transmission shafts and couplings for coupling the axles of the raisers to one another for synchronous rotation, and a motor for rotating the axle of the first raiser to move the raiser screws of the raisers to move the body to the desired elevation relative to the base.

DETAILED DESCRIPTION OF THE INVENTION

Figure 1:
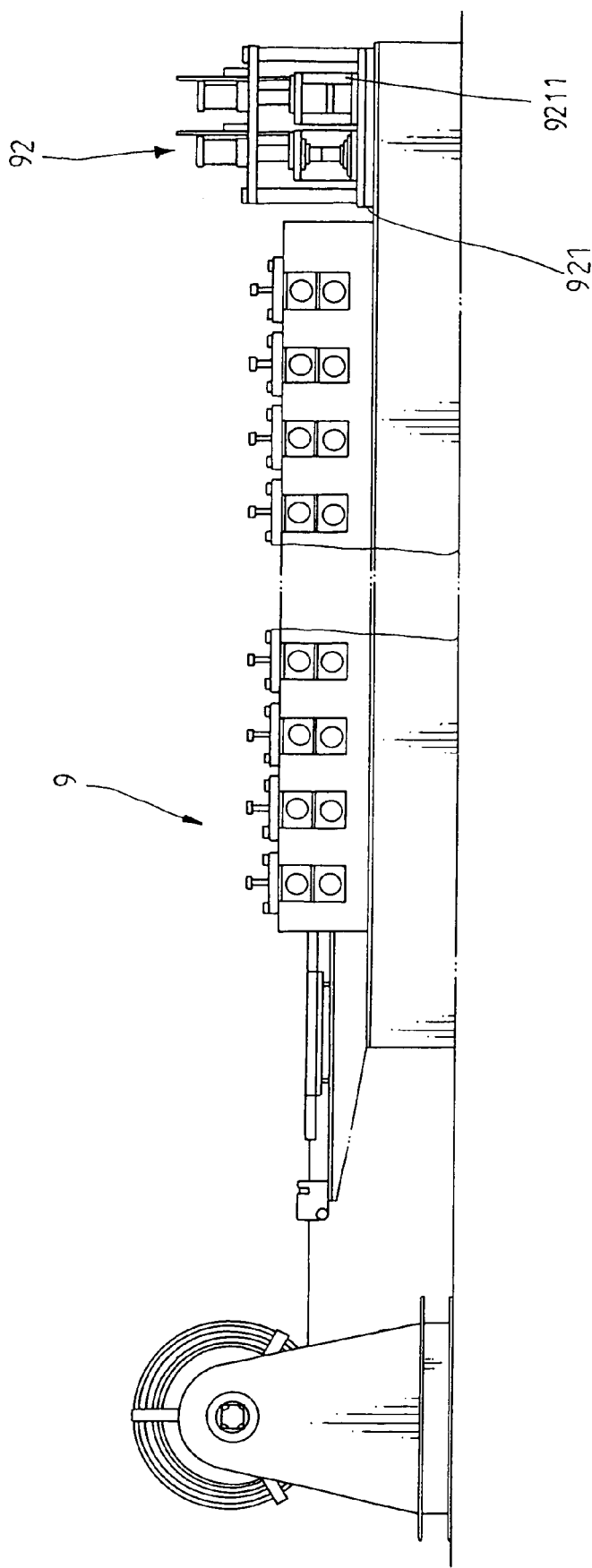
FIG. 1 is a plain view showing a hydraulic cut-off press installed in the rear side of a metal processing machine according to the prior art.

Referring to FIGS. 2~6, a hydraulic cut-off press is shown comprising a body 1, a base 2, a plurality of raisers 3, 4, 5,6, and a motor 70. The raisers 3,4,5,6 each comprise a holder base 31,41,51,61, a raiser screw 32,42,52,62 vertically mounted in the holder base 31,41,51,61, a transmission gear set (not shown) mounted inside the holder base 31,41,51,61 and meshed with the raiser screw 32,42,52,62, and an axle 33,43,53,63 (the axle 33 is not shown) extended out of the holder base 31,41,51,61 and adapted to drive the respective transmission gear set to rotate the raiser screw 32,42,52,62 upwards/downwards relative to the holder base 31,41,51,61 to the desired elevation.

The main features of the present invention are outlined hereinafter. The body 1 comprises a bottom plate 11. The holder bases 31,41,51,61 of the raisers 3, 4, 5,6 are fixedly fastened to the top side of the bottom plate 11 in four corners with fastening members 111. The raiser screws 32,42,52,62 each have the respective bottom end fixedly provided with a mounting block A, which is fixedly fastened to the base 2 by fastening members 30 (see FIGS. 5 and 6). The axle 33 of the first raiser 3 has one end coupled to the motor 70 (see FIGS. 2 and 3) and the other end coupled to one end of a first transmission shaft 71 through a coupling 81 (see FIG. 2). The first transmission shaft 71 has the other end coupled to one end of the axle 43 of the second raiser 4 through a coupling 82 (see FIG. 3). The other end of the axle 43 of the second raiser 4 is fixedly mounted with a bevel gear 44, which is meshed with a bevel gear 721 at one end of a second transmission shaft 72. The second transmission shaft 72 has the other end fixedly mounted with a bevel gear 722, which is meshed with a bevel gear 54 at one end of the axle 53 of the third raiser 5 (see FIG. 4). The other end of the axle 53 of the third raiser 5 is coupled to one end of a third transmission shaft 73 through a coupling 83 (see FIG. 5). The other end of the third transmission shaft 73 is coupled to one end of the axle 63 of the fourth raiser 6 by a coupling 84.

Figure 2:
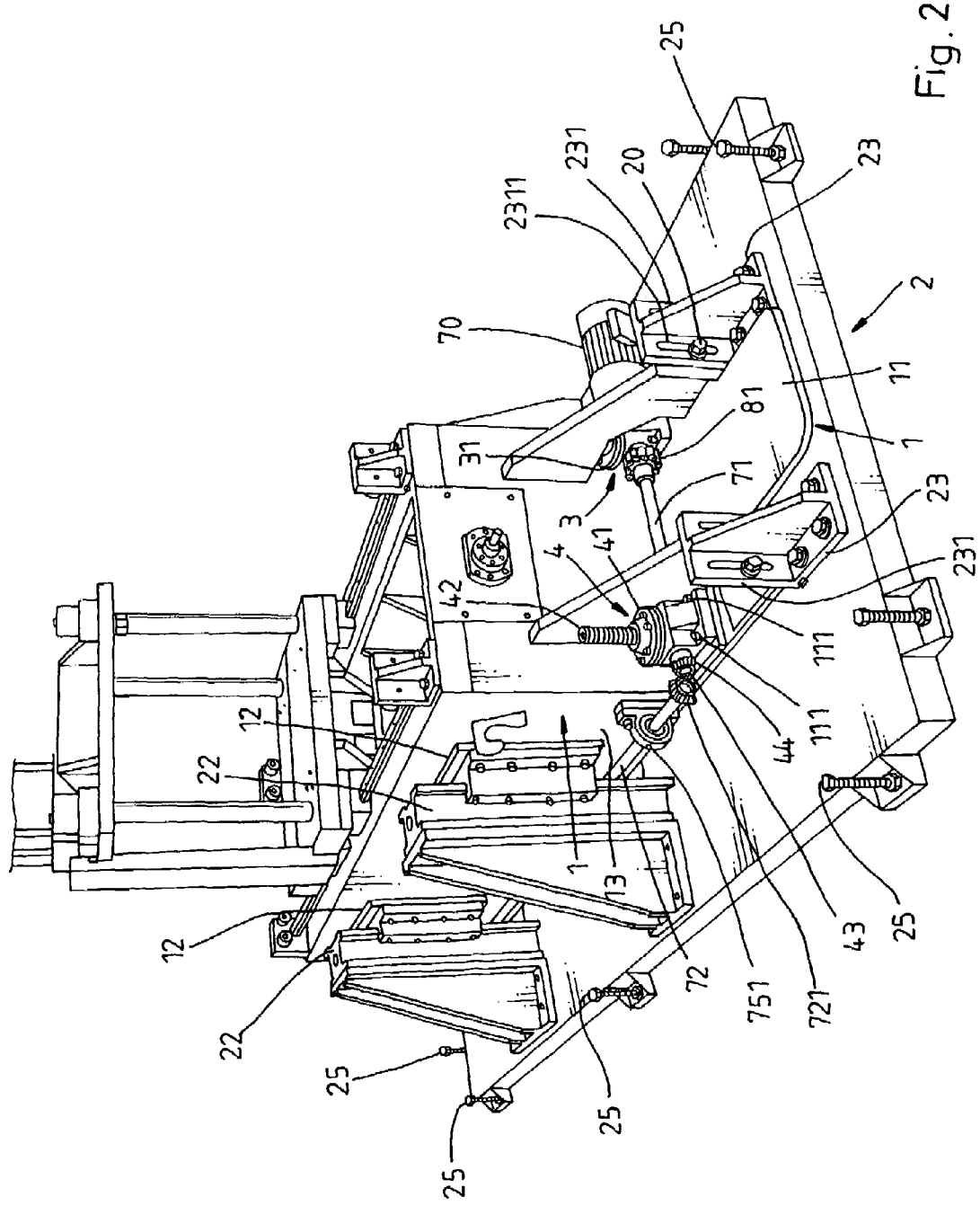
FIG. 2 is a perspective view of a hydraulic cut-off press constructed according to the present invention.
Figure 3:
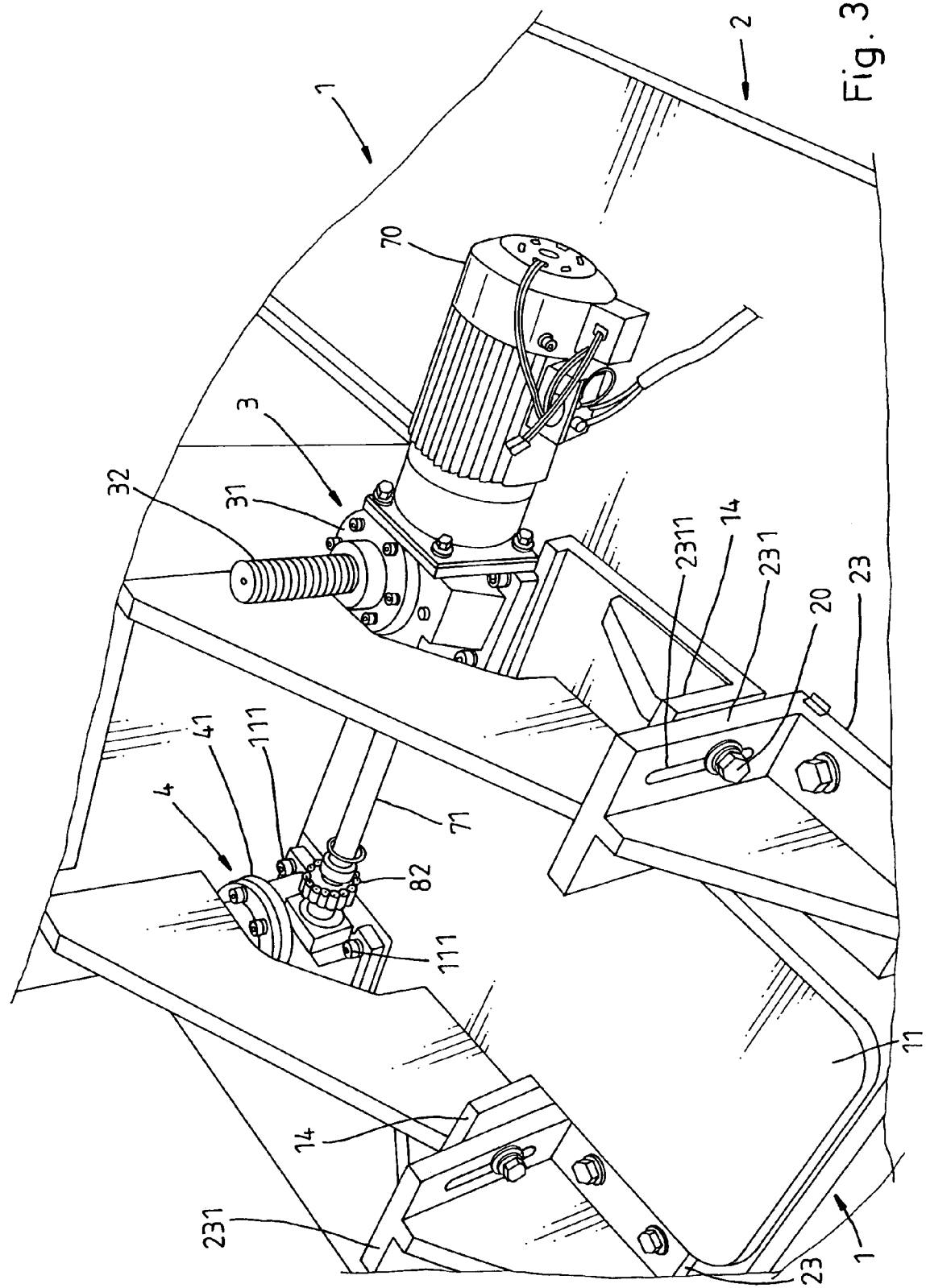
FIG. 3 is an enlarged view of a part of the hydraulic cut-off press according to the present invention.

Further, as shown in FIGS. 2 and 3, the base 2 comprises a plurality of vertical tracks 22 symmetrically provided at the top near two opposite lateral sides. The body 1 comprises a plurality of rails 12 respectively coupled to the vertical tracks 22 to guide movement of the body 1 vertically along the vertical tracks 22 relative to the base 2.

When started the motor 70, the axle 33 of the first raiser 3 is rotated to drive the respective transmission gear set to move the raiser screw 32 of the first raiser 3, and at the same time the first transmission shaft 71 is rotated to drive the axle 43 of the second raiser 4 to move the raiser screw 42 of the second raiser 4 via the transmission gear set of the second raiser 4, and the bevel gear 44 the axle 43 of the second raiser 4 is simultaneously driven to rotate the bevel gear 721 at one end of the second transmission shaft 72, causing the bevel gear 722 at the other end of the second transmission shaft 72 to rotate the bevel gear 54 at one end of the axle 53 of the third raiser 5 and to further move the raiser screw 52 of the third raiser 5 through the transmission gear of the third raiser 5, and at the same time the third transmission shaft 73 is rotated by the axle 53 of the third raiser 5 to rotate the axle 63 of the fourth raiser 6, causing the axle 63 to move the raiser screw 62 of the fourth raiser 6 via the transmission gear set of the fourth raiser 6, and therefore the body 1 of the hydraulic cut-off press is moved vertically along the vertical tracks 22 of the base 2 to the desired elevation.

Figure 4:
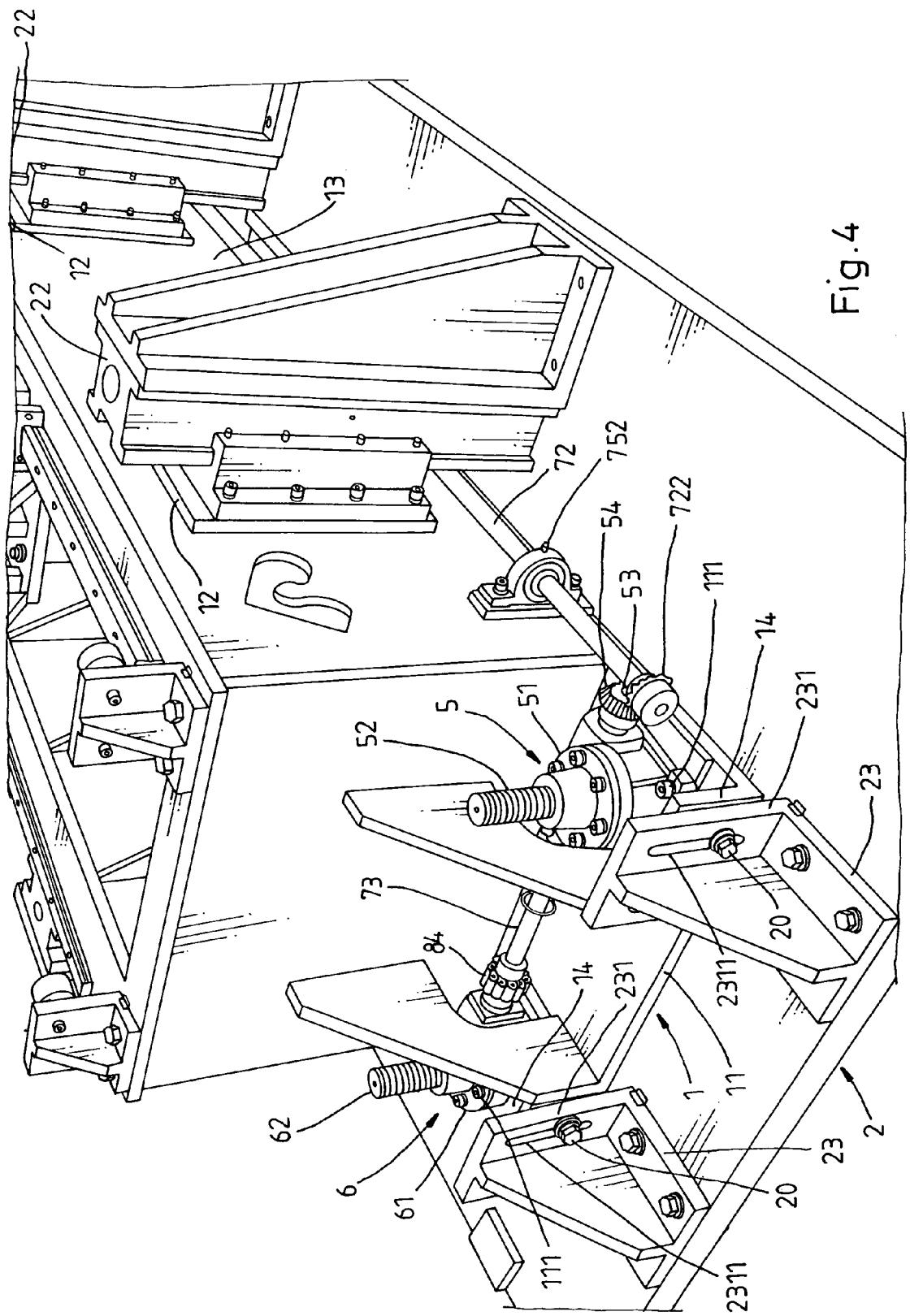
FIG. 4 is an enlarged view of another part of the hydraulic cut-off press according to the present invention.
Figure 5:
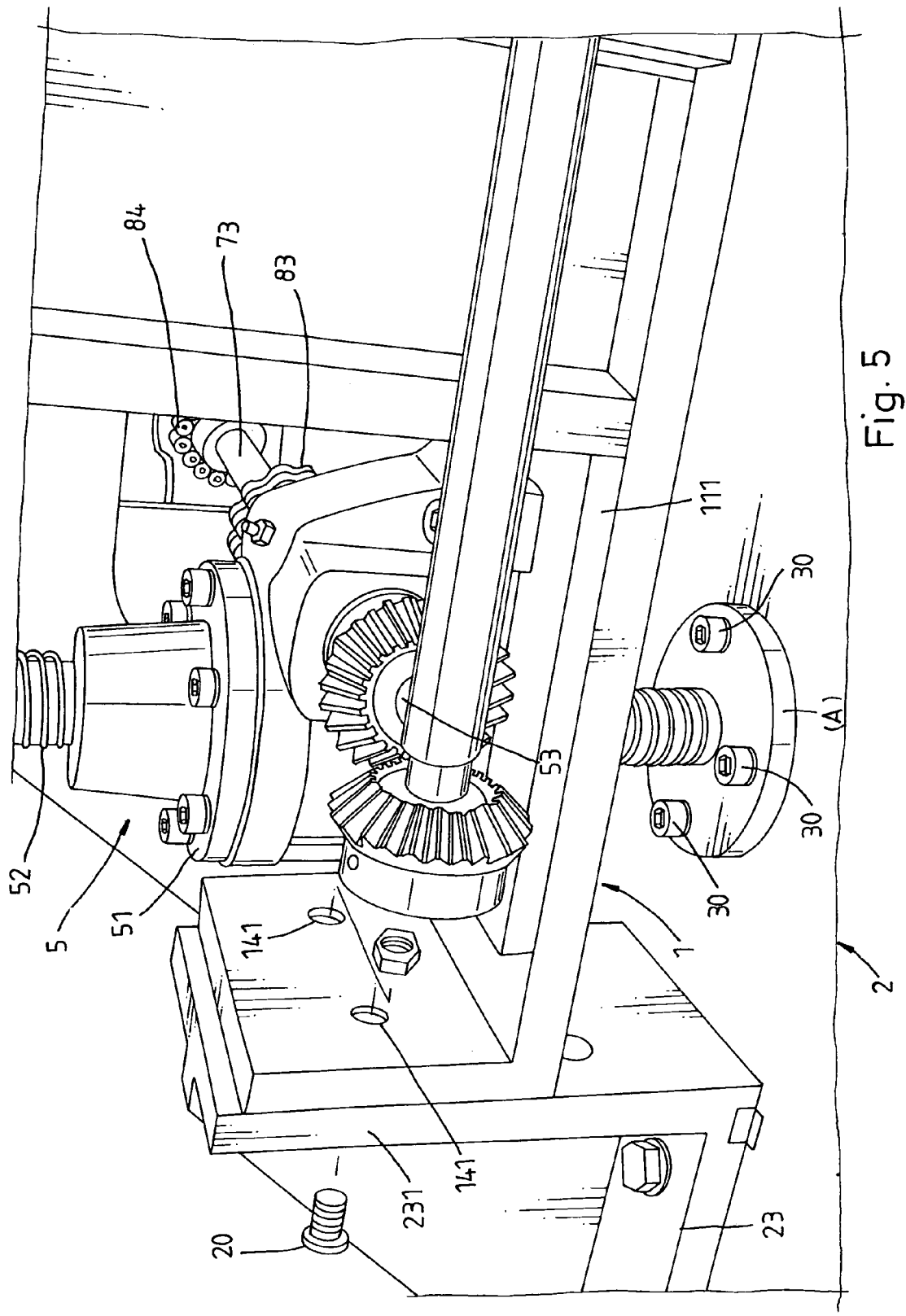
FIG. 5 is an enlarged view of still another part of the hydraulic cut-off press according to the present invention.
Figure 6:
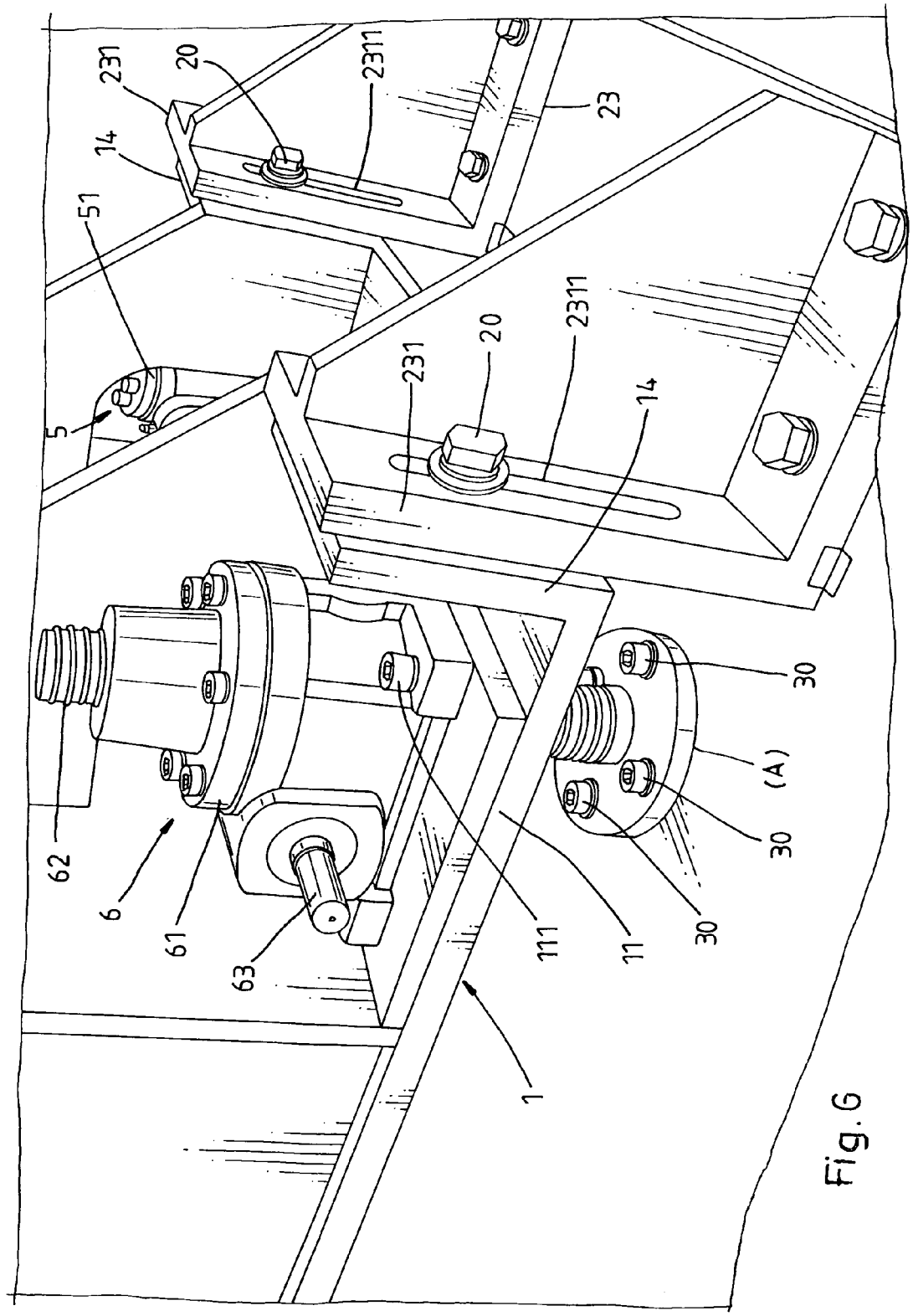
FIG. 6 is an enlarged view of still another part of the hydraulic cut-off press according to the present invention.

Further, bearing blocks 751 and 752 are fixedly provided at one sidewall 13 of the body 1 to support the second transmission shaft 72 (see FIGS. 2 and 4).

Further, the base 2 comprises a plurality of locating blocks 23 symmetrically provided at the top near the front and rear sides. Each locating block 23 has an upright locating plate 231 and a vertically extending slot 2311 in the upright locating plate 231. The bottom plate 11 of the body 1 further comprises a plurality of vertical locating flanges 14 corresponding to the locating blocks 23. Each vertical locating flange 14 has a through hole 141 corresponding to the vertically extending slot 2311 in the upright locating plate 231 of the respective locating block 23. After the body 1 has been moved to the desired elevation, fastening members 20 are respectively affixed to the through holes 141 of the vertical locating flanges 14 of the body 1 and the vertically extending slots 2311 in the upright locating plates 231 of the locating blocks 23 of the base 2 to lock the body 1 to the base 2 at the desired elevation.

Further, the base 2 is affixed to the floor, a worktable, or another machine with fastening members 25.

As indicated above, the invention has the following advantages:

1. The body of the hydraulic cut-off press can smoothly be moved to the desired elevation to fit different cutting metal-working operations.

2. A controller can be used to control the operation of the motor to lift the body of the hydraulic cut-off press automatically.

What is claimed is:

1. A hydraulic cut-off press comprising a body, a base, a first raiser, a second raiser, a third raiser and a fourth raiser, and a motor, said four raisers each comprising a holder base fixedly fastened to the body, a raiser screw vertically mounted in said holder base, a transmission gear set mounted inside said holder base and meshed with said raiser screw, and an axle extended out of two opposite sides of said holder base and adapted to drive said transmission gear set to rotate said raiser screw upwards/downwards relative to said holder base to the desired elevation;

wherein:

said body comprises a bottom plate, which holds the holder bases of said four raisers in four corners of a top side thereof;

the raiser screws of said four raisers each have a mounting block fixedly provided at a bottom side thereof and fixedly fastened to said base;

the axle of said first raiser has a first end coupled to a motor at said base and a second end coupled to one end of the axle of said second raiser through a first transmission shaft;

the axle of said second raiser has an opposite end fixedly mounted with a bevel gear;

a second transmission shaft is installed in said body, having a first bevel gear disposed at a first end thereof and meshed with the bevel gear of the axle of said second raiser and a second bevel gear disposed at a second end thereof;

the axle of said third raiser has a first end fixedly mounted with a bevel gear, which is meshed with the second bevel gear of said second transmission shaft, and a second end provided with a coupling;

a third transmission shaft is installed in said body, having a first end coupled to the coupling of the axle of said third raiser for synchronous rotation with the axle of said third raiser and a second end coupled to one end of the axle of said fourth raiser through a coupling;

said base comprises a plurality of vertical tracks symmetrically disposed near two opposite lateral sides thereof;

said body comprises a plurality of rails respectively coupled to said vertical tracks of said base and adapted to guide movement of said body vertically along said vertical tracks relative to said base, wherein said base comprises a plurality of locating blocks symmetrically provided near front and rear sides thereof, each said locating block having a lower plate fastened to said base and an upright locating plate with a vertically extending slot in said upright locating plate; the bottom plate of said body comprises a plurality of vertical locating flanges respectively connectable to said locating blocks of said base, each said vertical locating flange having a through hole for fastening to the vertically extending slots in said upright locating plates of said locating block of said base with fastening members to lock said body to said base at the desired elevation.

2. The hydraulic cut-off press as claimed in claim 1, wherein each of said locating blocks is located at a corner of said body.

* * * * *